United States Patent [19]

Coleman et al.

[11] Patent Number: 4,932,149

[45] Date of Patent: Jun. 12, 1990

[54] FISH LIFTING DEVICE

[75] Inventors: Roger C. Coleman, Nanaimo; Douglas W. Gorrie, Gabriola Island, both of Canada

[73] Assignee: P.R.A. Manufacturing Ltd., Nanaimo, Canada

[21] Appl. No.: 374,846

[22] Filed: Jul. 3, 1989

[51] Int. Cl.$^5$ .............................................. A01K 71/00
[52] U.S. Cl. ...................................................... 43/6.5
[58] Field of Search ......................... 43/4, 4.5, 6.5, 8; 415/72, 73, 88, 91, 124.1; 406/99; 417/179, 197

[56] References Cited

U.S. PATENT DOCUMENTS

| | | | |
|---|---|---|---|
| 2,163,282 | 6/1939 | Hovden | 43/6.5 |
| 2,573,907 | 11/1951 | Humphreys | 43/6.5 |
| 2,736,121 | 2/1956 | Kimmerle | 43/6.5 |
| 2,760,624 | 8/1956 | Compton | 415/72 |
| 3,314,184 | 4/1967 | Lerch | 43/6.5 |
| 3,768,193 | 10/1973 | London | 43/6.5 |
| 4,193,737 | 3/1980 | Lemmon | 43/6.5 |
| 4,217,718 | 8/1980 | Faivre | 43/6.5 |
| 4,551,938 | 11/1985 | Sheldon | 43/6.5 |

Primary Examiner—Kurt Rowan
Attorney, Agent, or Firm—Chernoff, Vilhauer, McClung & Stenzel

[57] ABSTRACT

Fish lifting devices using the principle of the Archimedes' screw are known. Such devices have used a lattice-work screw entry portion to dewater the screw at the point of entry of the fish. The present invention provides a venting system which causes a fish-attracting current at the entry to the device and further substitutes more economical dewatering slots in the outer shell for the lattice-work screws.

10 Claims, 4 Drawing Sheets

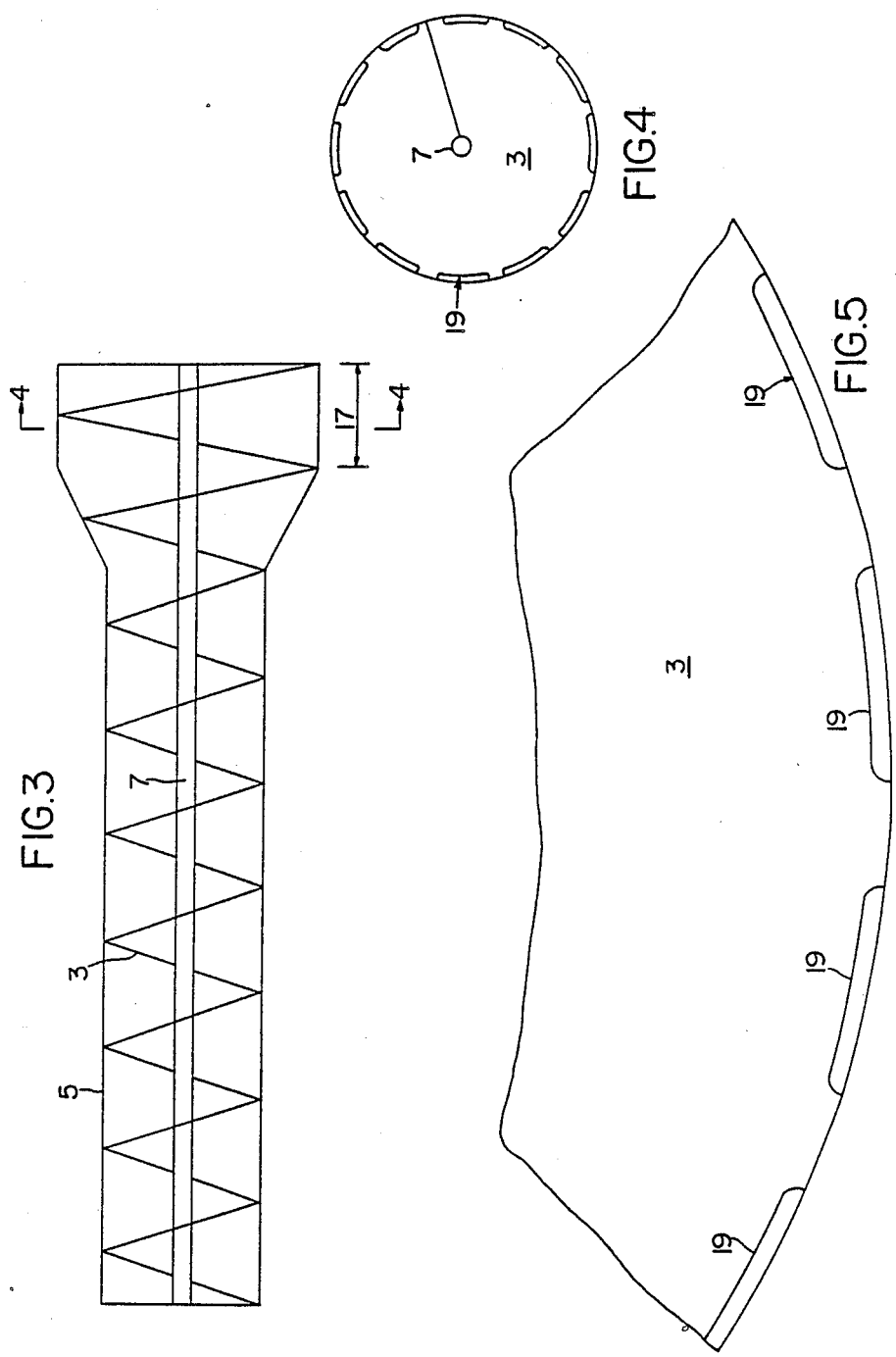

FISH LIFTING DEVICE

BACKGROUND OF THE INVENTION

The invention relates to the field of fish elevators which use the principle of the Archimedes' screw to raise fish from a body of water to a storage area.

The Archimedes' screw has been applied to the raising of fish from a body of water for the purpose of transportation, sorting and the like. For efficient operation of such a device it is important that sufficient dewatering of the lifting screw be provided to avoid carrying too much water up with the fish, and also that the structure of the entry portion be such that fish are not repelled. For example, Canadian patent no. 1,093,400 issued January 13, 1981 to Faivre discloses an Archimedes' screw adapted for lifting fish. This device has two screw sections rotating on a common shaft - a lifting screw which is a solid helix, and a catching screw which is a lattice-work helix. The fish are transferred from the catching screw to the lifting screw by means of a deflector formed in the cylindrical drum around the lifting screw. The lattice-work screw portion serves to dewater the transported fish. Typically the latticework must be metal and so the sheath around the entry portion is also of metal, adding to the cost of construction.

A problem with existing designs results from the fact that fish prefer to swim into a current and are frightened by an area of low water pressure. Further, the lattice-work helix design is expensive to mass-produce. Also, since it draws no water at its point of entry, a longer auger is needed for a particular length of lift.

SUMMARY OF THE INVENTION

The present invention provides a device for lifting fish which attracts fish to the entrance of the device using a counterflow current. The device comprises a solid auger of constant pitch and diameter for most of its length and which flares out to a greater diameter at its lower entry end. The auger is bonded to a solid fibreglass outer cylindrical sheath which is turned with the auger as a single unit. The outer cylinder is provided with dewatering slots in the vicinity of the flared end to dewater the auger. Slots are cut in the outer edge of the entry revolution of the auger to create a current away from the entrance to the device. There is a smooth transition from the flared portion of the auger into the main length of the auger.

BRIEF DESCRIPTION OF THE DRAWINGS

In drawings which illustrate a preferred embodiment of the invention:

FIG. 3 is a cross-sectional view taken along lines III—III of FIG. 2

FIG. 4 is a cross-sectional view taken along lines IV—IV of FIG. 3;

FIG. 5 is a detailed view of a portion of the section shown in FIG. 4;

DETAILED DESCRIPTION OF A PREFERRED EMBODIMENT

Figure 1:
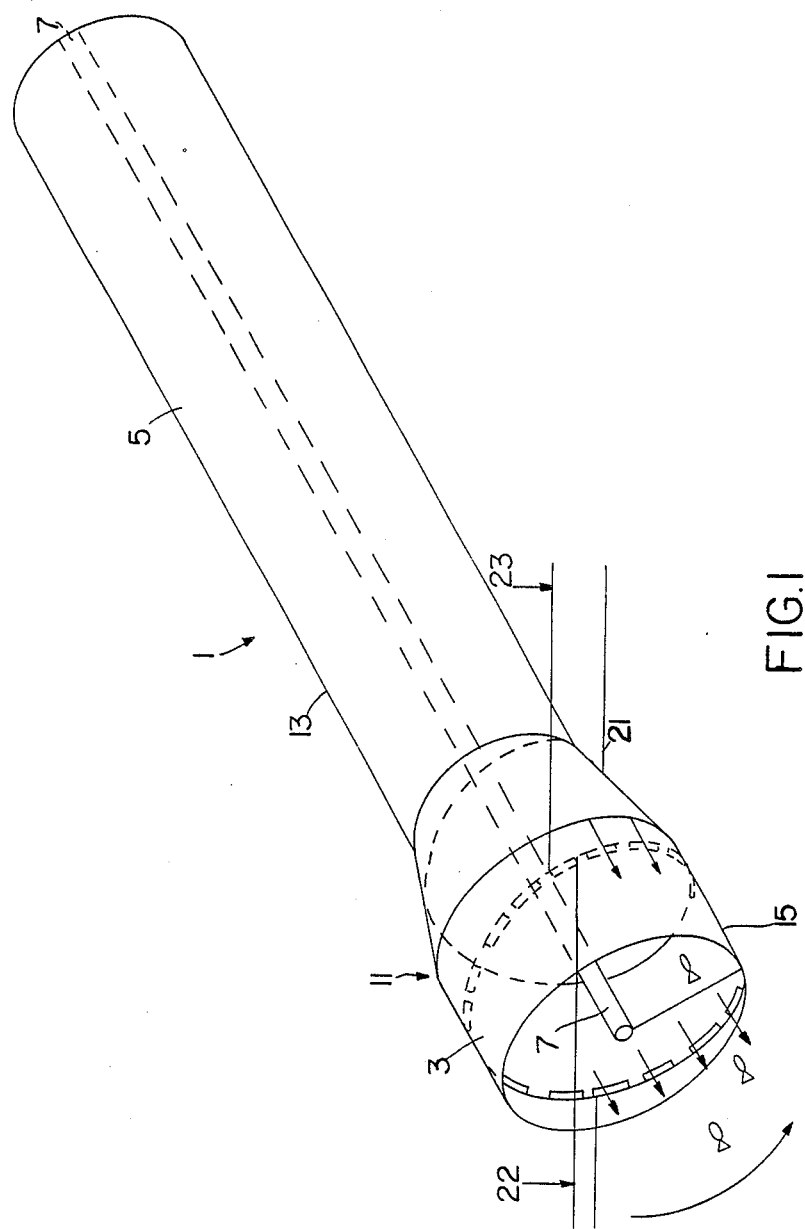
FIG. 1 is a perspective view of the auger and sheath of the invention.

With reference to the drawings, the fish lifting device (hereinafter referred to as a fish elevator) is designated generally as 1. It consists generally of a screw or auger 3 typically formed of glass fibre, and mounted within a cylindrical sheath 5. The screw and sheath rotate about a central shaft 7. The sheath is also typically made of glass fibre and is translucent in the upper region 13 to allow monitoring of the fish. The sheath and screw assembly is mounted in a supporting frame 9.

The screw and sheath assembly consists of two sections, an entry section 11 and a transport section 13. The screw and sheath of the transport section 13 form a cylinder of constant diameter. The entry section flares outwardly to a cylindrical portion 15 of greater diameter than the transport section. The screw 3, however, is continuous and of constant pitch as between the entry and transport sections, and varies only in diameter. Typical dimensions for the device would be a 36" diameter for the transport section, a 60" diameter for the entry section, and a 24" pitch for the screw. However other sizes are appropriate for different applications.

Figure 2:
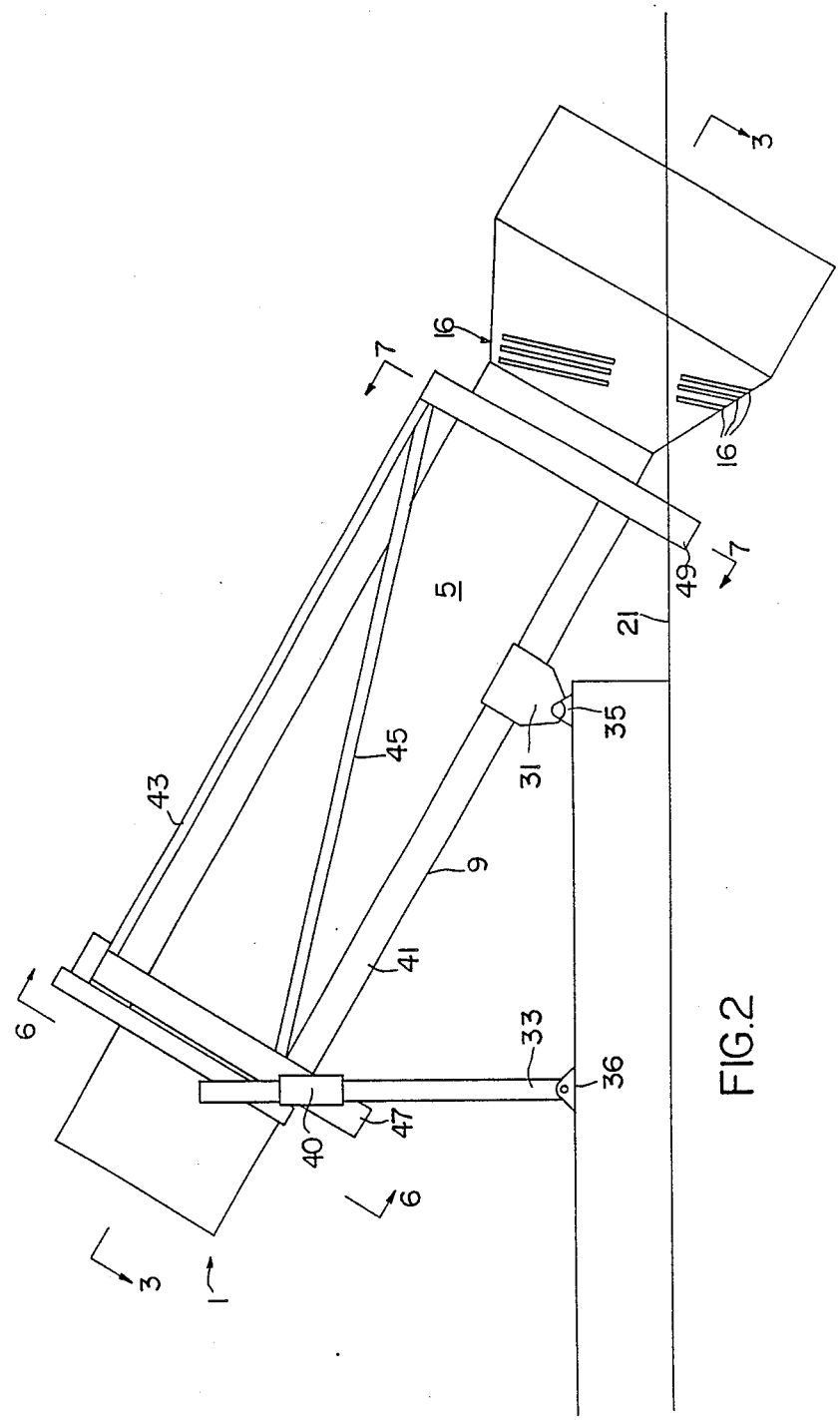
FIG. 2 is a side view of the invention shown in FIG. 1 mounted in its supporting frame.

As shown in FIG. 2, the sheath of the entry section has a number, shown as two sets of three, of parallel slots 16 in the angled or flaring portion of the sheath. Typically there will be six slots 12" long by ½" wide. These slots serve to dewater the first revolution of the screw as set out in further detail below. The lower section 13 is painted black using gel coat or the like to make it friendlier to the fish.

Along the outer edge of the screw in the region 17 of the first revolution, there are provided a series of slots or vents 19 which are approximately ¾" wide by 14" long. The purpose of these vents is to create a downwardly and outwardly directed current in the vicinity of the entry section which will attract rather than repel the fish. In operation, the sheath and screw assembly is mounted so that a portion of the entry section extends beneath the water line 21 as shown in FIG. 2. The assembly is rotated about shaft 7 causing, as in the typical Archimedes' screw, water to be drawn up the inner surface of the screw. The angle formed between the water line and the shaft 7 is optimally greater than 20 degrees.

Frame 9 consists of rigid longitudinal frame elements 41 and 43, cross-piece 45, square support elements 47 and 49, and adjustable supporting legs 31 and 33 which have feet 35 and 36 and pivot points 37. Forward foot 35 is connected to support leg 31 which in turn is fixed to frame element 41. Rear foot 36 is connected to leg 33 on which slides an adjustable element 40 connected also to the frame 9. In this way the angle of entry of the screw can be adjusted.

In the prior art device, an external frame is used to support a central bearing-mounted axle on which the sheath and screw rotate. The supporting frame must extend in front of the entry section and this causes obstructions to the entry of fish. In the present invention, the sheath is supported externally and this also supports the internal screw. There are no obstructions in the area of fish entry, and the entire device can be made lighter.

Figure 7:
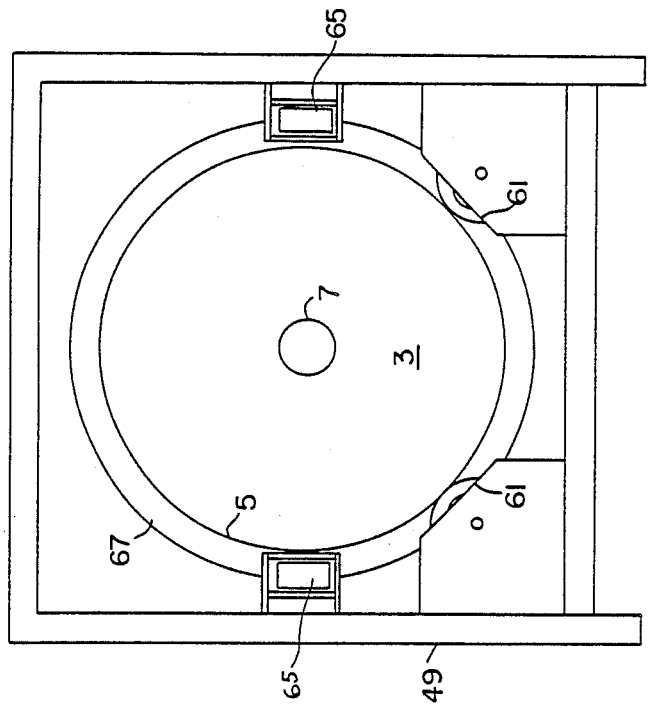
FIG. 7 is a cross-sectional view taken along lines VII—VII of FIG. 2.
Figure 6:
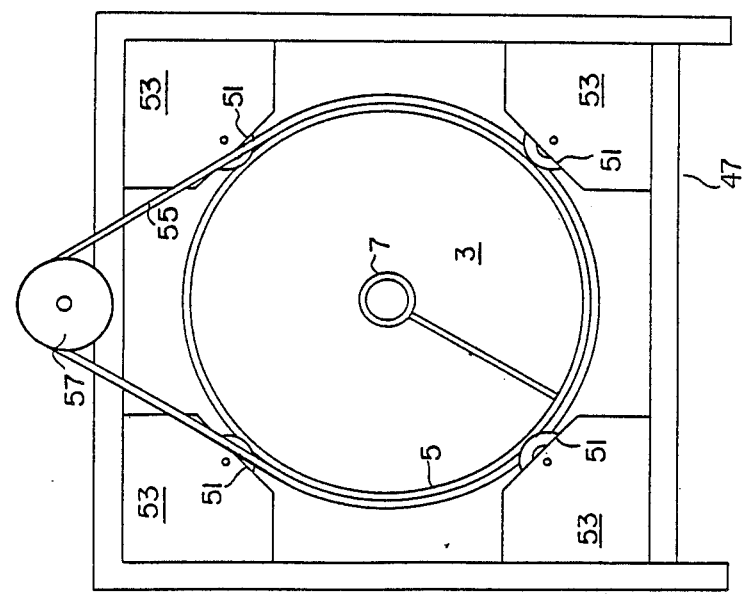
FIG. 6 is a cross-sectional view taken along lines VI—VI of FIG. 2.

The structure of the supporting elements 47 and 49 is shown in FIGS. 6 and 7 respectively. The top element 47 has four rollers 51 mounted for rotation in corner pieces 53. The rollers are positioned to bear snuggly against the sides of sheath 5, thereby holding it firmly in position while allowing rotation. A drive band 55 of rubber or the like extends around sheath 5 and a drive pulley 57 is motor-driven to rotate the sheath and screw. The lower support element 49 has two rollers 61 mounted for rotation in corner elements 63 in the two lower corners of the frame. Rollers 61 bear against the sides of sheath 5. Two further rollers 65 are mounted for rotation about axes of rotation perpendicular to shaft 7 in frames 66. A circular collar 67 fixed to the sheath 5 bears against the rollers 65 due to the force of gravity and holds the sheath in vertical position while allowing it to rotate.

In operation the entry end of the screw is inserted into the body of water as shown in FIG. 2 and the sheath is rotated by drive band 55. Water and fish are drawn up the screw. A certain portion of the water drawn up by the screw (to levels 22 or 23 in FIG. 1) drains through vents 19 and causes a counter-current as indicated by the arrows in FIG. 1, attracting the fish. As the fish and water are drawn further up the screw, the desired amount of dewatering is done by slots 16. Some of the water from point of entry, however, travels the full length of the device.

The present invention, due to the fact that the auger provides lift of the water right from the end of the device, does not require the degree of submerging of the prior art device, where the fish entry end is latticework and does not lift water. Thus the present invention can be used in shallower water, and provides a higher lift with an auger of the same length.

As will be apparent to those skilled in the art, various modifications and adaptations of the structure above described may be made without departing from the spirit of the invention, the scope of which is to be construed in accordance with the accompanying claims.

We claim:

1. A device for lifting fish comprising a helical screw fixed in a cylindrical sheath having an open fish-receiving end, and supported for rotation in a frame, means for dewatering the end of said helical screw adjacent said fish-receiving end, and means for rotating said sheath, characterized in that said screw is provided, in the region of said fishreceiving end, with a plurality of apertures adapted to direct water in the direction of said fish-receiving end.

2. The device of claim 1, wherein said means for dewatering comprises, in the vicinity of said fish-receiving end, a plurality of apertures in said cylindrical sheath adapted to drain water from the interior of said sheath.

3. The device of claim 2 wherein the diameter of said cylindrical sheath adjacent said fish-receiving end of said sheath is greater than the diameter of said sheath distant from said fish-receiving end.

4. The device of claim 1 wherein said frame comprises first and second supporting frame elements, each of said first and second frame elements comprising rollers for contacting and rotatably supporting said sheath.

5. The device of claim 4 wherein said sheath comprises a collar element forming a circular surface perpendicular to the axis of said sheath and extending radially from said sheath and wherein said second frame element comprises rollers adapted for bearing against said collar element and thereby rotatably supporting said sheath.

6. The device of claim 5 wherein said means for rotating comprises a continuous flexible band in frictional contact with said cylindrical sheath and driven by power-operated motor means.

7. The device of claim 1 wherein said apertures are located on the outer circumference of said screw adjacent said cylindrical sheath.

8. The device of claim 3 wherein a continuous taper is provided between said larger diameter and said smaller diameter portions of said cylindrical sheath.

9. The device of claim 8 wherein said dewatering apertures are located in said tapered portion of said cylindrical sheath.

10. The device of claims 1, 3 or 8 wherein said cylindrical sheath is translucent except adjacent said fish-receiving end where it is opaque.

* * * * *